United States Patent [19]

Baumann

[11] 4,017,771
[45] Apr. 12, 1977

[54] SAFEGUARDED SWITCHING DEVICE

[76] Inventor: Ludwig G. Baumann, Im Reckholder, 9527 Niederhelfenschwil, Switzerland

[22] Filed: July 21, 1975

[21] Appl. No.: 597,351

[30] Foreign Application Priority Data

Oct. 19, 1974 Germany .......................... 2449745

[52] U.S. Cl. .............................. 361/357; 200/50 A; 200/61.73; 200/333
[51] Int. Cl.² ......................................... H01H 3/20
[58] Field of Search ............ 317/114, 120; 200/18, 200/50 A, 61.71, 61.73, 329, 330, 333, 153 LA, 153 T

[56] References Cited

UNITED STATES PATENTS

| 2,752,464 | 6/1956 | Seeger | 200/330 |
| 3,196,877 | 7/1965 | Corbin | 200/330 |
| 3,233,071 | 2/1966 | Buzzell | 200/333 |
| 3,663,781 | 5/1972 | Zimmerman | 200/330 |
| 3,719,871 | 3/1973 | Houst | 200/153 T |

FOREIGN PATENTS OR APPLICATIONS 1,282,497   7/1972   United Kingdom .............. 200/330

Primary Examiner—Gerald P. Tolin
Attorney, Agent, or Firm—McGlew and Tuttle

[57] ABSTRACT

The device safeguards switches and other electrical components controlling an electric motor, such as the motor of a blowing device for air bubbling mats in bathtubs. A casing of dielectric material is arranged to enclose an electric motor, and has a recess in its exterior wall in which are mounted motor controlling components including a master motor switch having an outwardly projecting, normally externally accessible switch operator. A cover plate of dielectric material is mounted on the exterior wall and cooperable with guiding rails or the like for sliding movement along the exterior wall. The cover plate has a first position, in which it completely cover the recess, and releases the master motor switch to close, and has a second position in which certain of the components are exposed for external access but in which the cover plate engages the switch operator of the master motor switch to maintain the master motor switch opened.

5 Claims, 3 Drawing Figures

SAFEGUARDED SWITCHING DEVICE

FIELD OF THE INVENTION

The invention relates to a casing of dielectric material for enclosing an electric motor and having motor controlling components, including a master motor switch, mounted on an exterior wall.

The characteristic feature of the invention consists in the fact that there is provided, on the exterior surface of the casing, an insulating or dielectric plate movable in rails or the like which, in its closed-position, covers from the exterior and in shock-proof relation, the electric fittings, such as a time switch, a control lamp and the like, a fuse as well as the motor master switch which is pre-arranged in respect of the time switch.

It is only when the insulating or dielectric plate attains a position fully enclosing the electric fittings that switching-in of the motor master switch, which up until that point had been maintained in an opened position, is effected so that the motor master switch is closed. In the event that the plate is moved in the opposite direction towards the limited off-position, the insulating plate will disconnect or open immediately the switched-in motor master switch and it will continue to cover, in a shock-proof manner, the motor master as well as the fuse even after the final off-position has been attained. It is within the contemplation of this invention that a person is not in a position to effect any manipulations at the switch device since the motor master switch and the fuse are always covered not only when the insulating plate is in the enclosing position but also when the insulating plate is partially open. switching-in and switching-off of the master switch can only be done by means of moving the insulating plate in the proper direction.

For an understanding of the principles of the invention, reference is made to the following description of a typical embodiment thereof as illustrated in the accompanying drawings.

DESCRIPTION OF THE PREFERRED EMBODIMENT

Figure 1:
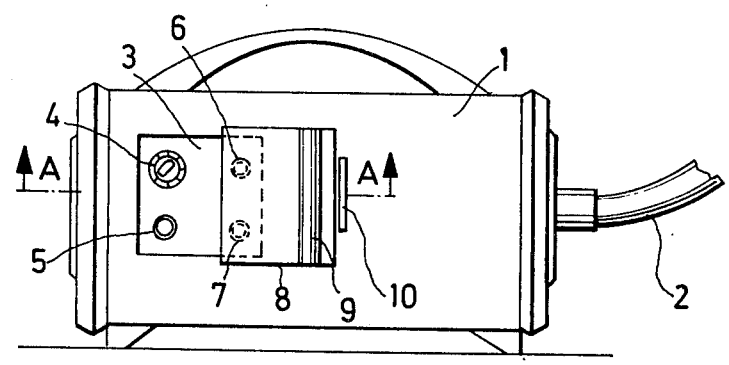
FIG. 1 is a front view of the complete safeguarded switching device.

There is placed within the dielectric casing 1 represented in FIG. 1 a motor driven device made of nonconducting material. For the purpose of assuring that the user cannot manipulate the electric switchgear located in a recess 3 at the front of the casing, so that the person concerned may run the risk of an electric shock, there is provided an insulating dielectric plate 8 which is movable, relative to the electric fittings such as a time switch 4, control a lamp or the like 5, a fuse 6 and a motor master switch 7, by means of rails 2 or the like and insulating plate 8 covers these elements outwards in a shock-proof manner.

Figure 2:
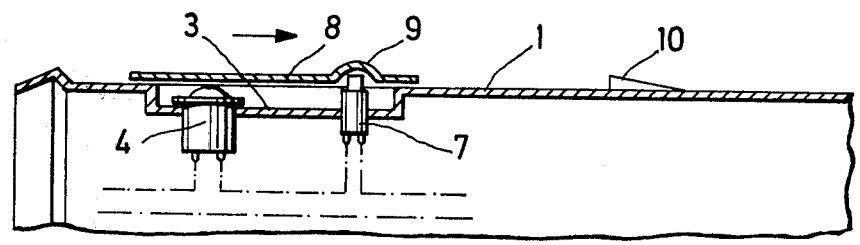
FIG. 2 is a sectional view, on the line A—A, of FIG. 1 of the front surface of the case of the device while the insulating plate is closed i.e. at the time that the electric fittings are enclosed outwards in a shock-proof manner.

The special feature of the invention consists in the fact that the insulating plate 8 permits the switching-in of the motor master switch 7 in its definitive closed-position only. The version of FIG. 2 provides that the insulating plate 8 is equipped with a semi-cylindrical offset or groove 9 extending outwardly and which, in the closed position of the insulating plate 8 receives the tappet or operator of the motor master switch 7, which has been so far switched off, and thus there is effected the switching-in operation of the main current.

Figure 3:
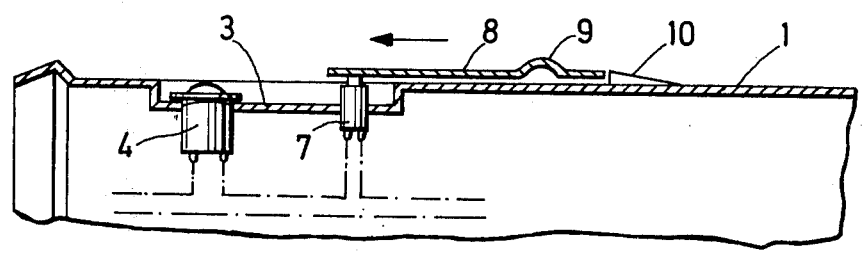
FIG. 3 is the same sectional view as FIG. 2 while, however, the insulating plate is opened and the motor master switch as well as the fuse remain covered in a shock-proof manner.

In the event that the insulating plate 8 is moved in the opposite direction into the off-position of FIG. 3, which is limited in motion by means of a cam lobe 10, the tappet of the motor master switch 7 slips immediately out of its groove 9 and effects the opening of the switch 7.

However, when the final off-position has been reached, the insulating plate 8 will continue to cover the disconnected motor master switch 7 with and fuse 6 so that it is not at all possible to put into operation the motor when the insulating plate is in off-position, unless the time switch 4 is tuned in to a given time.

While a specific embodiment of the invention has been shown and described in detail to illustrate the application of the principles of the invention, it will be understood that the invention may be embodied otherwise without departing from such principles.

What is claimed is:

1. A safeguarded switching device, for switches and other electrical components controlling an electric motor, comprising, in combination, a casing of dielectric insulating material arranged to enclose an electric motor; motor controlling components, including a motor master switch, mounted on an exterior wall of said casing, said motor master switch having an outwardly projecting, normally externally accessible switch operator; a cover plate of dielectric insulating material mounted on said exterior wall; guiding means cooperable with said cover plate and operable to guide said cover plate, for sliding movement along said exterior wall, between a first position, in which said cover plate covers all of said components, and a second position, in which certain of said components are exposed for external access but said motor master switch is still covered; said cover plate, in said first position, releasing said motor master switch to close and, in said second position, engaging said switch operator to maintain said motor master switch opened.

2. A safeguarded switching device, as claimed in claim 1, in which said motor master switch is a normally open switch.

3. A safeguarded switching device, as claimed in claim 1, in which said motor controlling components are mounted in a recess in said exterior wall of said casing; said cover plate, in its first position, completely enclosing said recess to the exterior.

4. A safeguarded switching device, as claimed in claim 3, in which said cover plate is formed with an outwardly projecting offset defining an inwardly opening recess aligned with said switch operator only in said first position of said cover plate completely closing said recess to the exterior.

5. A safeguarded switching device, as claimed in claim 4, including abutment means on said exterior wall of said casing engaging said cover plate in its second position and limiting said cover plate to a position in which it still covers said motor master switch.

* * * * *